United States Patent
Pust et al.

(10) Patent No.: US 7,082,016 B2
(45) Date of Patent: Jul. 25, 2006

(54) MULTILAYER MAGNETIC SHIELDS WITH COMPENSATED THERMAL PROTRUSION

(75) Inventors: Ladislav Rudolf Pust, Savage, MN (US); Mark Thomas Kief, Savage, MN (US); Ibro Tabakovic, Edina, MN (US); James F. Dolejsi, Chaska, MN (US); Vee Sochivy Kong, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 255 days.

(21) Appl. No.: 10/375,621

(22) Filed: Feb. 27, 2003

(65) Prior Publication Data

US 2004/0012894 A1    Jan. 22, 2004

Related U.S. Application Data

(60) Provisional application No. 60/397,634, filed on Jul. 22, 2002.

(51) Int. Cl.
*G11B 5/11* (2006.01)
*G11B 5/33* (2006.01)

(52) U.S. Cl. .................................................. 360/319
(58) Field of Classification Search ................ 360/319, 360/313, 110
See application file for complete search history.

(56) References Cited

U.S. PATENT DOCUMENTS

| | | | |
|---|---|---|---|
| 5,490,028 A | 2/1996 | Ang et al. | 360/126 |
| 5,636,088 A | 6/1997 | Yamamoto et al. | 360/245.1 |
| 5,640,753 A * | 6/1997 | Schultz et al. | 29/603.08 |
| 5,663,856 A | 9/1997 | Packard | 360/122 |
| 5,710,683 A | 1/1998 | Sundaram | 360/126 |
| 5,896,243 A | 4/1999 | Koshikawa et al. | 360/234.7 |
| 5,896,244 A | 4/1999 | Watanabe et al. | 360/234.6 |
| 5,898,542 A | 4/1999 | Koshikawa et al. | 360/234.7 |
| 5,909,340 A | 6/1999 | Lairson et al. | 360/237.1 |
| 5,949,627 A | 9/1999 | Williams et al. | 360/126 |
| 6,074,566 A | 6/2000 | Hsiao et al. | 360/123 |
| 6,252,741 B1 | 6/2001 | Ahn | 360/235.1 |
| 6,266,216 B1 * | 7/2001 | Hikami et al. | 360/317 |
| 6,366,428 B1 | 4/2002 | Yamanaka et al. | 360/126 |
| 6,381,094 B1 | 4/2002 | Gill | 360/126 |
| 6,441,994 B1 | 8/2002 | Wang et al. | 360/123 |
| 6,679,762 B1 * | 1/2004 | Fatula, Jr. et al. | 451/153 |
| 6,775,108 B1 * | 8/2004 | Kief et al. | 360/319 |
| 6,859,343 B1 * | 2/2005 | Alfoqaha et al. | 360/126 |
| 6,909,578 B1 * | 6/2005 | Missell et al. | 360/126 |
| 2002/0006018 A1 | 1/2002 | Narumi et al. | 360/317 |
| 2003/0067717 A1 | 4/2003 | Garfunkel et al. | 360/234.5 |

(Continued)

OTHER PUBLICATIONS

U.S. Appl. No. 09/649,985, filed Aug. 29,2000, Shukh et al.
U.S. Appl. No. 09/664,270, filed Sep. 18,2000, Shukh et al.

(Continued)

*Primary Examiner*—Julie Anne Watko
(74) *Attorney, Agent, or Firm*—Kinney & Lange, P.A.

(57) ABSTRACT

A reader formed in a data transducer includes a first shield, a read gap, a second shield, a maanetic compensation layer, and a non-magnetic spacer layer. The first shield is formed of a multilayer comprised of a layer of a first material. The second shield is spaced apart from the first shield by the read gap. The magnetic compensation layer is formed in the first shield and has a coefficient of thermal expansion of less than the coefficient of thermal expansion of the first material. The non-magnetic spacer layer separates the first material layer and the compensation layer of the first shield.

20 Claims, 2 Drawing Sheets

U.S. PATENT DOCUMENTS

2003/0081359 A1* 5/2003 Pust et al. .................. 360/319
2004/0008451 A1* 1/2004 Zou et al. ................... 360/317
2004/0223265 A1* 11/2004 Ohtomo et al. ............. 360/317

OTHER PUBLICATIONS

R.M Bozorth, Ferromagnetism, pp. 165-166, (Princeton, NJ: D. VanNostrand Co, Inc) 1978.

H. Masumoto, 'On the Thermal Expansion of the Alloys of Iron, Nickel, and Cobalt and the Cause of the Small Expansibility of Alloys of the Invar Type', *Science Reports of the Tohoku Imperial University*, vol. XX, 1931, pp. 101-123.

* cited by examiner

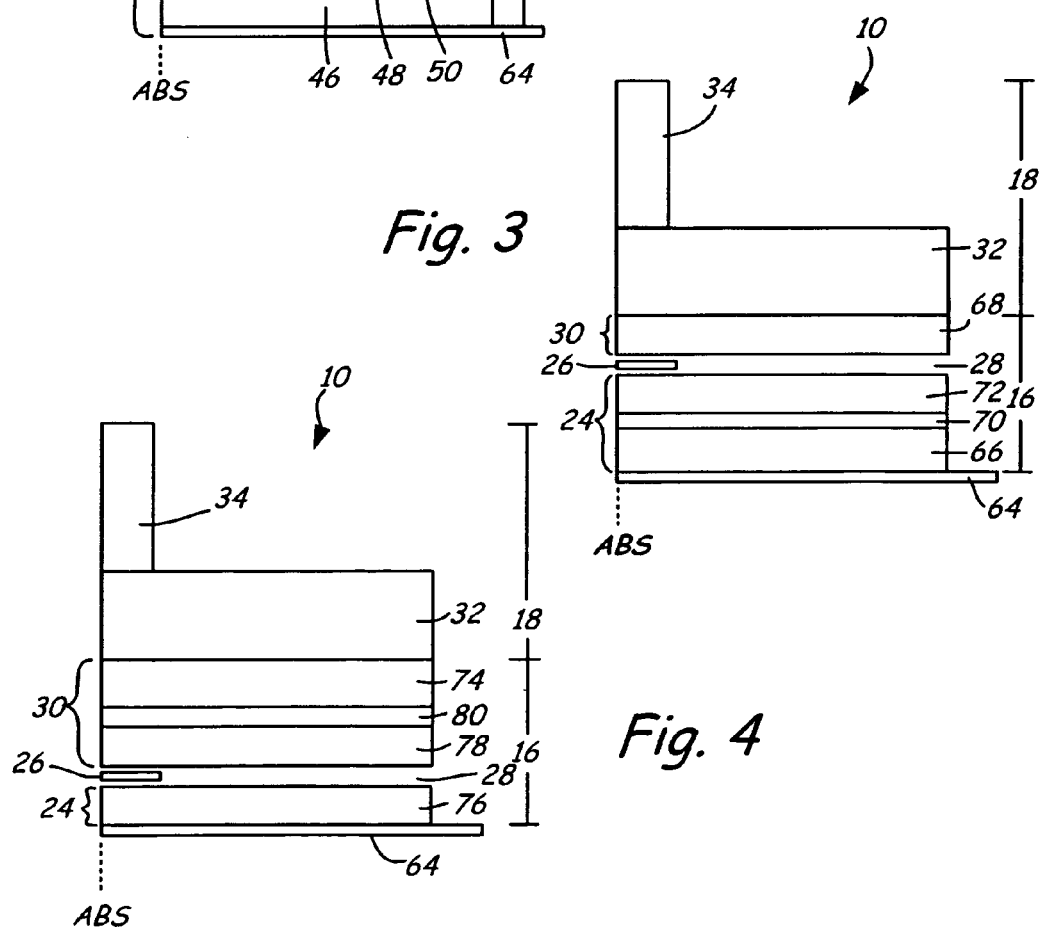

MULTILAYER MAGNETIC SHIELDS WITH COMPENSATED THERMAL PROTRUSION

CROSS-REFERENCE TO RELATED APPLICATION(S)

This application claims priority from provisional application No. 60/397,634 filed Jul. 22, 2002, for "MULTILAYER MAGNETIC SHIELDS WITH COMPENSATED THERMAL PROTRUSION" by Ladislav Rudolf Pust, Mark Thomas Kief, Ibro Tabakovic, James F. Dolejsi, and Vee Sochivy Kong.

BACKGROUND OF THE INVENTION

The present invention relates generally to the field of magnetic data storage and retrieval systems. In particular, the present invention relates to a thin film transducing head having improved performance due to a reduced thermal pole tip protrusion.

In a magnetic data storage and retrieval system, a thin film transducing head typically includes a transducer, a substrate upon which the transducer is built, and an overcoat deposited over the transducer. The transducer, which typically includes a writer portion for recording magnetically-encoded information on a magnetic media and a reader portion for retrieving that magnetically-encoded information from the magnetic media, is formed of multiple layers successively stacked upon the substrate. The volume of the transducer is typically much smaller than both the volume of the substrate and the volume of the overcoat.

The layers of the transducer, which include both metallic and insulating layers, all have different mechanical and chemical properties than the substrate. These differences in properties affect several aspects of the transducer. First, the layers of the transducing head will be lapped at different rates. Thus, when an air bearing surface (ABS) of the transducing head is lapped during its fabrication, different amounts of the layers will be removed, resulting in the transducing head having an uneven ABS. Commonly, a greater amount of the metallic layers of the transducer will be removed during the lapping process than will be removed from the substrate. Thus, the lapping process results in a pole-tip recession (PTR) of the metallic layers of the transducer with respect to the substrate. The PTR of a particular layer is defined as the distance between the air bearing surface of the substrate and the air bearing surface of that layer.

The differing mechanical and chemical properties of the substrate and transducer layers affect the air bearing surface during operation of the transducing head. As the magnetic data storage and retrieval system is operated, the transducing head is subjected to increased temperatures within the magnetic data storage and retrieval system. In addition, a temperature of the transducing head itself, or a part thereof, may be significantly higher than the temperature within the magnetic data storage and retrieval system due to heat dissipation caused by electrical currents in the transducer.

The coefficient of thermal expansion (CTE) of materials used in forming the substrate is typically much smaller than the CTE of materials used in forming the metallic layers of the transducer. Due to the large CTE of the transducer's metallic layers, those layers tend to expand a greater amount in response to high temperatures than the substrate. Thus, when the transducing head is subjected to high operating temperatures, the metallic layers tend to protrude closer to the magnetic disc than the substrate, thereby affecting the PTR of the transducer. This change in PTR caused by temperature is referred to as the Thermal PTR (TPTR).

During operation of the magnetic data storage and retrieval system, the transducing head is positioned in close proximity to the magnetic media. The distance between the transducer and the media is preferably small enough to allow for writing to and reading from the magnetic media with a large areal density, and great enough to prevent contact between the magnetic media and the transducing head. Performance of the transducer depends primarily upon the distance between the media and the transducing head.

To keep the distance between the transducing head and the magnetic media constant, PTR should not change significantly with temperature. If TPTR is large, then the spacing between the transducer and the media will change significantly with temperature, thereby requiring that the low temperature fly height be enough to accommodate the higher operating temperatures. On the other hand, if TPTR is close to zero, the low temperature fly height can be reduced.

In typical transducing heads, the magnetic shields are made of Permalloy, in particular a NiFe alloy with a composition close to 20% Fe–80% Ni. Permalloy is nearly ideal shielding material with very high permability and nearly zero magnetostriction. However, Permalloy has a large CTE, between 12 and $13 \times 10^{-6}/°$ C. Large thermal expansion of the shields, in comparison to the AlTiC substrate, is a major contributor to TPTR. Without drastic reduction of TPTR, disc drives with such transducing heads cannot operate at areal density around and above 100 Gb/inch$^2$. Other prior art solutions for reducing the shield contribution to TPTR include (a) using a smaller shield, (b) using a thinner shield, or (c) manufacturing the shield with another magnetic material having a low CTE, such as 45/55 NiFe. These known solutions only partially reduce TPTR and oftentimes result in transducing heads having deteriorated magnetic performance.

The present invention is a transducing head structure that reduces the TPTR of magnetic shields when the transducing head is operated at high temperatures.

BRIEF SUMMARY OF THE INVENTION

The present invention relates to a magnetic head having a substrate and a data transducer positioned upon the substrate. The data transducer includes a reader comprised of a top shield and a bottom shield characterized by at least one of the shields including a layer for compensating a thermally-caused expansion of the reader.

BRIEF DESCRIPTION OF THE DRAWINGS

FIG. 2 is a schematic cross-sectional view of the transducing head in accord with the present invention.

FIG. 3 is a schematic cross-sectional view of another embodiment of a transducing head in accord with the present invention.

FIG. 4 is a schematic cross-sectional view of another embodiment of a transducing head in accord with the present invention.

DETAILED DESCRIPTION

Figure 1:
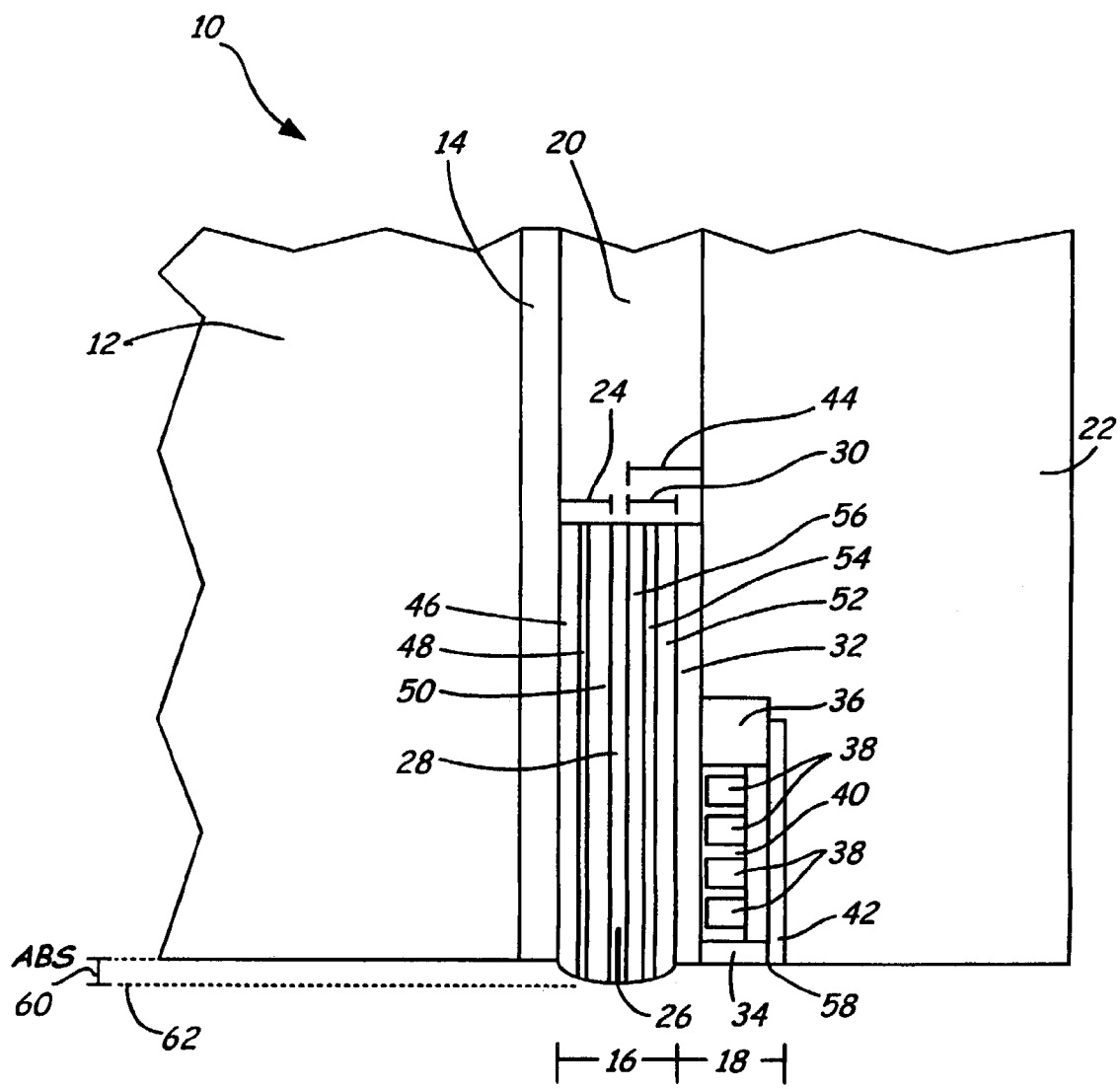
FIG. 1 is a partial cross-sectional view of a transducing head in accord with the present invention.

FIG. 1 is a partial cross-sectional view of a transducing head 10 in accord with the present invention. The cross-section of FIG. 1 is taken substantially normal to an air bearing surface (ABS) of transducing head 10. Transducing head includes a substrate 12, a basecoat 14, a reader 16, a writer 18, an insulating layer 20 and an overcoat 22. Reader 16 includes a bottom shield structure 24, a read element 26, a read gap 28, and a top shield structure 30. Writer 18 includes a bottom pole 32, a shared pole extension 34, a back via 36, a conductive coil 38, a coil insulator 40, and a top pole 42. A shared pole 44 is formed by the combination of top shield structure 30 and bottom pole 32.

Basecoat 14 is deposited on substrate 12. Reader 16 and writer 18 are each multi-layered devices, which are stacked upon basecoat 14 adjacent the ABS of transducing head 10. As shown in FIG. 1, reader 16 is formed on basecoat 14, and writer 18 is stacked on reader 16 in a piggyback configuration (in which layers are not shared between the two elements). In other embodiments not illustrated, reader 16 and writer 18 may be arranged in a merged-head configuration (in which layers are shared between the two elements) and/or writer 18 may be formed on basecoat 14 (with reader 16 being formed on writer 18). Co-planarly positioned with the layers of reader 16 and writer 18, and opposite the ABS of transducing head 10, is insulating layer 20. Overcoat 22 is formed upon writer 18 and insulating layer 20.

Substrate 12 is typically formed of a material such as AlTiC, TiC, Si, SiC, $Al_2O_3$, or other composite materials formed of combinations of these materials. Of these materials, AlTiC and TiC have relatively large coefficients of thermal expansion (CTE), typically in the range of about $6.6 \times 10^{-6}/°$ C. to about $8.3 \times 10^{-6}/°$ C., while silicon has a lower CTE, in the range of about $2.0 \times 10^{-6}/°$ C. to about $3.0 \times 10^{-6}/°$ C.

Basecoat 14 is formed on substrate 12 in transducing head 10 shown in FIG. 1, although other embodiments may have basecoat 14 formed in an alternative location. Basecoat 14 is generally formed of an insulating material, such as $Al_2O_3$, AlN, $SiO_2$, $Si_3N_4$, or $SiO_{0-2}N_{0-1.5}$. Generally the insulating material for basecoat 14 is selected to most closely match the chemical and mechanical properties of the material used as substrate 12. For example, an $Al_2O_3$ basecoat is commonly used in conjunction with an AlTiC substrate, since the two materials have similar CTE.

Reader 16 is formed on basecoat 14, and includes bottom shield structure 24, read element 26, read gap 28, and top shield structure 30. Bottom shield structure 24 is a multi-layered structure comprised of a compensation layer 46, a non-magnetic spacer 48, and a bottom shield 50. Compensation layer 46 is formed upon basecoat 14 and bottom shield 50 is formed adjacent read gap 28. Non-magnetic spacer 48 is positioned between compensation layer 46 and bottom shield 50. The multi-layered bottom shield structure 24 is manufactured in a one-step plating or sputtering process.

Top shield structure 30 is spaced apart from the bottom shield structure 24 by read gap 28. Top shield structure 30 is a multi-layered structure comprised of a compensation layer 52, a non-magnetic spacer 54, and a top shield 56. Top shield 56 is positioned adjacent read gap 28 and non-magnetic spacer 54 separates top shield 56 from compensation layer 52. Compensation layer 52 is formed upon non-magnetic spacer 54 of top shield structure 30. The multi-layered top shield structure 30 is manufactured in a one-step plating or sputtering process.

Bottom and top shields 50 and 56 are formed of Permalloy, and in particular a NiFe allow with a composition close to 20% Fe–80% Ni. Such a metallic alloy typically has a large CTE. For example, $Ni_{79}Fe_{21}$ has a CTE of about $12.2 \times 10^{-6}/°$ C. Permalloy exhibits large permeability and low coercivity needed for shields.

Compensation layers 46 and 52 are formed of a material having a low CTE, such as Invar, a NiFe alloy with a composition close to 35% Fe–65% Ni. Preferably, compensation layers 46 and 52 are made of a low CTE material having a CTE between about $1 \times 10^{-6}/°$ C. to about $2.5 \times 10^{-6}/°$ C., and most importantly less than the CTE of the shields.

Non-magnetic spacers 48 and 54 function to magnetically separate each shield (50 and 56) from its respective compensation layer (46 and 52) to ensure better magnetic performance of shields 50 and 56. Although the material forming compensation layers 46, 52 has a low CTE, it is also a magnetic material. Thus, non-magnetic spacers 48, 54, separate shields 50, 56 and compensation layers 46, 52 to protect shields 50, 56 from magnetic noise. First spacer 48 is positioned between bottom shield 50 and first compensation layer 46, and second spacer 54 is positioned between top shield 56 and second compensation layer 52. Furthermore, spacers 48, 54 are positioned adjacent the ABS. Spacers 48, 54 are formed of a non-magnetic material, such as NiPd, CuNi, NiP, Cr, or Alumina.

Read gap 28 is defined on the ABS between terminating ends of bottom shield 50 and top shield 56. Read element 26 is positioned in read gap 28 adjacent the ABS. Read gap 28 insulates read element 26 from bottom shield 50 and top shield 56. Read element 26 may be any variety of different types of read elements, such as an anisotropic magnetoresistive (MR) read element or a giant magnetoresistive (GMR) read element. In operation, magnetic flux from a surface of a magnetic media causes rotation of a magnetization vector of MR read element 26, which in turn causes a change in electrical resistivity of MR read element 26. The change in resistivity of read element 26 can be detected by passing a current through read element 26 and measuring a voltage across read element 26.

Writer 18 is formed on reader 16, and includes bottom pole 32, shared pole extension 34, back via 36, conductive coil 38, coil insulator 40, and top pole 42. Bottom pole 32 is formed on top shield structure 30. Shared pole extension 34 and back via 36 are formed on bottom pole 32, with shared pole extension 34 being positioned adjacent the ABS and back via 36 being spaced away from the ABS. A write gap 58 is defined on the ABS between shared pole extension 34 and top pole 42. Top pole 42 is formed over shared pole extension 34 and extends from the ABS to back via 36. Conductive coil 38 is positioned in coil insulator 40 between bottom pole 32 and top pole 42, wrapping around back via 36, such that the flow of electrical current through conductive coil 38 generates a magnetic field across write gap 58.

Transducing head 10 is a piggyback configuration in which top shield structure 30 of reader 16 and bottom pole 32 of writer 18 are made of separate layers. Although not illustrated, transducing head 10 may also be arranged in a merged-head configuration in which shared pole 44 serves as top shield structure 30 for reader 16 and bottom pole 32 for writer 18, or in a merged-head configuration in which reader 16 is built upon writer 18.

Each of bottom shield 50, top shield 56, bottom pole 32, shared pole extension 34, back via 36, and top pole 42 are formed of metallic materials. Preferably, each of these components is formed of an alloy primarily composed of Fe, Ni, and/or Co. Bottom and top shields 50, 56 are preferably formed of Permalloy, a NiFe alloy having a composition of about 20% Fe–80% Ni. Such metallic alloys typically have large CTE's. For example $Ni_{79}Fe_{21}$ has a CTE of about $12.2\times10^{-6}/°$ C.

Read gap 28 is generally formed of an insulating material such as $Al_2O_3$. Coil 38 is generally formed of an electrically-conductive metal such as copper, gold, or silver. Most commonly used is copper, which has a CTE of about $16.5\times10^{-6}/°$ C. Coil insulator 40 is generally formed from a cured photoresist having a large CTE, or from other insulating materials, such as AlN, $SiO_2$, and $Si_3N_4$.

Not shown in FIG. 1 are electrical leads and contacts to read element 26 and coil 38. The electrical leads and contacts are typically formed of metals, such as gold, tantalum, or metallic alloys.

Insulating layer 20 is positioned in-plane with layers of reader 16 and writer 18 of transducing head 10, opposite the ABS. Insulating layer 20 is preferably formed of an insulating material, such as $Al_2O_3$, AlN, $SiO_2$, $Si_3N_4$, and $SiO_{0-2}N_{0-1.5}$.

Overcoat 22 is formed over top pole 42 in the embodiment shown in FIG. 1, and generally is formed over writer 18. Overcoat 22 is typically formed of an insulating material, such as $Al_2O_3$, AlN, $SiO_2$, $Si_3N_4$, and $SiO_{0-2}N_{0-1.5}$.

In the embodiment of the present invention shown in FIG. 1, two compensation layers are utilized. Compensation layer 46 is located on top of basecoat 14 and beneath first non-magnetic spacer 48, and compensation layer 52 is located on top of second non-magnetic spacer 54 and beneath bottom pole 32. Compensation layers 46, 52 have a thickness no greater than 90% of a thickness of the respective bottom or top shield. The thickness of bottom and top shields 50, 56 is between about 0.2 micron and about 2.5 microns.

Compensation layer 46 is formed between basecoat 14 and first spacer 48. Compensation layer 52 is formed between second spacer 54 and writer 18. Compensation layers 46, 52 are formed of a low CTE compensation material, which has a CTE between about $1.0\times10^{-6}/°$ C. and about $2.5\times10^{-6}/°$ C. Preferably, compensation layers 46, 52 are formed of a NiFe alloy having a composition of 35% Fe–65% Ni. However, many other low CTE materials may be used as compensation layers 46 and 52, such as, but not limited to, element or alloy metals, dielectric, and semiconductor materials having a CTE between about $1.0\times10^{-6}/°$ C. and about $2.5\times10^{-6}/°$ C. Examples of such materials that may be used are W, Mo, Cr, Si, Ta, Zr, Hf, Os, Ge, Re, Ru, Ce, B, Ir, NiFe, TiW, silicon oxides, silicon nitrides, and silicon oxide nitrides.

Bottom shield structure 24 and top shield structure 30 are each formed in a single step and mask during fabrication of transducing head 10, such as by plating or sputtering.

The layers of transducing head 10 all have differing mechanical and chemical properties, and in particular the layers of bottom shield structure 24 and top shield structure 30. Due to these differing properties, the layers of transducing head 10 will be lapped at different rates. Thus, the lapping of the ABS of transducing head 10 during fabrication results in transducing head 10 having an uneven ABS, as seen in FIG. 1. Commonly, a greater amount of the metallic layers of transducing head 10 will be removed during the lapping process than will be removed from substrate 12, resulting in a pole tip recession (PTR) of the metallic layers with respect to substrate 12. The PTR of a particular layer is defined as the distance between the ABS of substrate 12 and the ABS of that layer. A gap 60 of the present invention transducing head 10 is defined as the distance between the ABS of substrate 12 and an ABS 62 of shield structures 24 and 30.

The differing mechanical and chemical properties of the layers of transducing head 10 further affect the ABS of transducing head 10 during operation. The CTE of materials used in forming substrate 12 is typically much smaller than the CTE of the materials used in forming the metallic layers of transducing head 10, in particular bottom shield 50 and top shield 56. Due to the larger CTE of the metallic layers, those layers tend to expand a greater amount than substrate 12. Thus, when transducing head 10 is subjected to a high operating temperature, the metallic layers protrude closer to the magnetic disc than substrate 12, thereby affecting the PTR of the metallic layers of transducing head 10. This change is PTR caused by the temperatures referred to as the Thermal PTR (TPTR).

The present invention addresses the problem of TPTR by using multi-layered bottom shield structure 24 and multi-layered top shield structure 30. Compensation layers 46 and 52 formed in each shield structure compensate for the high CTE of the metallic layers of transducing head 10. Generally, compensation layers 46,52 are located close to high CTE materials that are the large TPTR contributing factors of shields 50,56. Compensation layers 46,52 extend substantially perpendicular to and rearward from the ABS of transducing head 10 and lie substantially parallel to shields 50,56 of transducing head 10. Relative to substrate 12, the low CTE materials of compensation layers 46, 52 recess as the operating temperature rises and protrude as the operating temperature drops, exactly opposite to the high CTE materials that are sources of TPTR found in magnetic shield structures 24,30. The present invention multi-layered shield structures 24,30 maintain the size of gap 60 at high operating temperatures and prevent TPTR of shield structures 24,30 by canceling and compensating for shields 50,56 contribution to TPTR. Furthermore, use of low CTE layers 46,52 in the magnetic shields does not impact performance of transducing head 10.

FIG. 2 is a schematic cross-sectional view of transducing head 10 in accord with the present invention. Shown in FIG. 2 is reader 16 and a portion of writer 18, in particular bottom pole 32 and shared pole extension 34. Bottom shield structure 24 is comprised of first compensation layer 46, first non-magnetic spacer 48, and bottom shield 50. In the embodiment shown in FIG. 2, first compensation layer 46 is formed upon a bottom shield seed layer 64. Bottom shield seed layer 64 is a conductive surface used for plating bottom shield 50. Bottom shield seed layer 64 is not required to achieve reduced TPTR and such layer may be omitted depending upon the process of manufacturing bottom shield structure 24.

First non-magnetic spacer 48 separates compensation layer 46 and bottom shield 50 to ensure better magnetic performance of bottom shield 50. Furthermore, first non-magnetic spacer 48 shields bottom shield 50 from magnetic noise from first compensation layer 46. Similar reduced TPTR can be achieved when there is no spacer layer in bottom shield structure 24.

Top shield structure 30 is spaced apart from bottom shield structure 24 by read gap 28. Top shield structure 30 is comprised of top shield 56, second non-magnetic spacer 54, and second compensation layer 52. Bottom pole 32 is formed upon top shield structure 30. Bottom shield 50 of bottom shield structure 24 and top shield 56 of top shield structure 30 both lie adjacent to read gap 28. Second spacer 54 separates top shield 56 from second compensation layer 52 to ensure better magnetic performance of reader 16. For example, the material commonly used as compensation layers 46,52 has a low CTE, but is also magnetic material. Non-magnetic spacers 48,54 between shields 50,56 and respective compensation layers 46,52 protect shields 50,56 from magnetic noise from compensation layers 46,52.

Generally, compensation layers 46,52 are positioned and located close to high CTE layers of magnetic shield structures 24,30, which are the TPTR contributing features of transducing head 10. By appropriately selecting the material and size of the compensation layer, the compensation layer will counterbalance and compensate for the larger CTE of the metallic layers of shield structures 24,30. Compensation layers 46,52 maintain the TPTR close to zero, thereby enabling the fly height of transducing head 10 with respect to a readable/writeable media to remain low and enhance the performance of transducing head 10. At high operating temperatures, compensation layers 46,52 recess relative to substrate 12, pulling back nearby protruding metallic layers of shields 50,56. As the operating temperature drops, compensation layers 46,52 protrude relative to the high CTE material and reduce recession.

FIG. 3 is a schematic cross-sectional view of another embodiment of reader 16 of transducing head 10 in accord with the present invention. In the embodiment shown in FIG. 3, bottom shield structure 24 includes a compensation layer 66 to reduce TPTR whereas top shield structure 30 is comprised of only a top shield 68. Bottom shield structure 24 is comprised of compensation layer 66, a non-magnetic spacer 70, and a bottom shield 72. Writer 18 of transducing head 10, and in particular bottom pole 32 and shared pole extension 34, is formed upon top shield 68 of reader 16.

FIG. 4 is a schematic cross-sectional view of another embodiment of transducing head 10 in accord with the present invention. In the embodiment shown in FIG. 4, top shield structure 30 includes a compensation layer 74 to reduce TPTR, whereas bottom shield structure 24 is comprised of only a bottom shield 76. Top shield structure 30 includes a top shield 78, a non-magnetic spacer 80, and compensation layer 74. Writer 18 of transducing head 10, and in particular bottom pole 32 and shared pole extension 34, is formed upon top shield 68 of reader 16.

As illustrated by the embodiments shown in FIGS. 3 & 4, the low CTE compensation layers may be used adjacent to either the bottom shield or the top shield and still result in a large TPTR reduction within reader 16.

The present invention reduces thermal pole-tip protrusion and recession in a transducing head, and in particular the magnetic shields of a reader in the transducing head. The present invention is a multi-layered magnetic shield used as a bottom shield and/or a top shield within a reader of the transducing head. Each magnetic shield structure is comprised of a magnetic shield and a compensation layer. Preferably, the shield and the compensation layer are separated by a non-magnetic spacer. The compensation layer is formed of a low CTE material, such as Invar, which recesses as the temperature rises and protrudes as the temperature drops, relative to a substrate of the transducing head. Low TPTR enables continuous reduction of head disc spacing, which is critical with high recording areal density. The compensation layers counter-balance the thermal protrusion effects of the metallic layers of the magnetic shields to prevent increased TPTR of the transducing head and maintain fly height.

Although the present invention has been described with reference to preferred embodiments, workers skilled in the art will recognize that changes may be made in form and detail without departing from the spirit and scope of the invention.

The invention claimed is:

1. A reader formed in a data transducer, the reader comprising:
   a first multilayer shield structure comprising a layer of a first magnetic material and a magnetic compensation layer;
   a read gap; and
   a second shield spaced apart from the first multilayer shield structure by the read gap;
   wherein the magnetic compensation layer has a coefficient of thermal expansion between about $1 \times 10^{-6}/°$ C. and $12.2 \times 10^{-6}/°$ C.

2. The reader of claim 1 wherein the first multilayer shield structure is a bottom shield structure.

3. The reader of claim 2 wherein a thickness of the magnetic compensation layer is no more than 90% of a thickness of the first magnetic material layer of the first multilayer shield structure.

4. The reader of claim 2 wherein a thickness of the first magnetic material layer is between about 0.2 micron and about 2.5 microns.

5. The reader of claim 1 wherein the second shield is a top shield.

6. The reader of claim 1 wherein the magnetic compensation layer is comprised of a NiFe alloy having a composition of about 65% Ni and about 35% Fe.

7. The reader of claim 1 wherein the first magnetic material layer is comprised of a NiFe alloy having a composition of about 80% Ni and about 20% Fe.

8. The reader of claim 1 wherein the first multilayer shield structure is formed in a single processing step.

9. The reader of claim 1 wherein the first magnetic material is comprised of a NiFe alloy having a composition of about 79% Ni and about 21% Fe.

10. A reader formed in a data transducer, the reader comprising:
    a first multilayer shield structure comprising a first magnetic material layer, a magnetic compensation layer, and a non-magnetic spacer layer;
    a read gap; and
    a second shield spaced apart from the first multilayer shield structure by the read gap;
    wherein the magnetic compensation layer has a coefficient of thermal expansion between about $1 \times 10^{-6}/°$ C. and $12.2 \times 10^{-6}/°$ C.; and
    wherein the non-magnetic spacer layer separates the first magnetic material layer of the first multilayer shield structure and the magnetic compensation layer of the first multilayer shield structure.

11. The reader of claim 10 wherein the non-magnetic spacer has a thickness between about 0.1 micron and about 0.5 micron.

12. A thin film transducer having a substrate and a sensing portion, the sensing portion including a sensing element, a first multilayer shield structure, and a second shield structure, the sensing portion including:
    a magnetic layer for compensating a thermally-caused expansion of the transducer, wherein the magnetic layer for compensating has a coefficient of thermal expansion between about $1 \times 10^{-6}/°$ C. and about $12.2 \times 10^{-6}/°$ C.

13. The transducer of claim 12 wherein the layer for compensating is comprised of a layer formed in the first multilayer shield structure.

14. The transducer of claim 13 wherein the layer for compensating is comprised of a layer formed in the second shield structure.

15. The transducer of claim 12, wherein the layer for compensating has a coefficient of thermal expansion less than $8.3 \times 10^{-6}/°$ C.

16. The transducer of claim 12, wherein the layer for compensating has a coefficient of thermal expansion less than $6.6 \times 10^{-6}/°$ C.

17. The transducer of claim 12, wherein the layer for compensating has a coefficient of thermal expansion between about $1.0 \times 10^{-6}/°$ C. and about $2.5 \times 10^{-6}/°$ C.

18. The transducer of claim 12 wherein the layer for compensating is comprised of a NiFe alloy having a composition of about 65% Ni and about 35% Fe.

19. A transducer comprising:

a sensing portion having a first multilayer shield structure, the first multilayer shield structure having a first magnetic layer for compensating a thermally-caused expansion of the transducer, a second magnetic layer, and a non-magnetic spacer layer; and a read gap;

wherein the coefficient of thermal expansion for the first magnetic layer is between about $1 \times 10^{-6}/°$ C. and about $2.5 \times 10^{-6}/°$ C.

20. The transducer of claim 19 wherein the non-magnetic spacer layer separates the first magnetic layer of the first multilayer shield structure and the second magnetic layer of the first multilayer shield structure.

* * * * *